US 9,286,690 B2

(12) United States Patent
Huang et al.

(10) Patent No.: US 9,286,690 B2
(45) Date of Patent: Mar. 15, 2016

(54) METHOD AND APPARATUS FOR MOVING OBJECT DETECTION USING FISHER'S LINEAR DISCRIMINANT BASED RADIAL BASIS FUNCTION NETWORK

(71) Applicant: National Taipei University of Technology, Taipei (TW)

(72) Inventors: Shih-Chia Huang, Taipei (TW); Bo-Hao Chen, Taipei (TW)

(73) Assignee: National Taipei University of Technology, Taipei (TW)

( * ) Notice: Subject to any disclaimer, the term of this patent is extended or adjusted under 35 U.S.C. 154(b) by 0 days.

(21) Appl. No.: 14/210,465

(22) Filed: Mar. 14, 2014

(65) Prior Publication Data

US 2015/0262374 A1 Sep. 17, 2015

(51) Int. Cl.
G06T 7/20 (2006.01)
G06K 9/62 (2006.01)

(52) U.S. Cl.
CPC .............. G06T 7/20 (2013.01); G06K 9/6256 (2013.01)

(58) Field of Classification Search
USPC ........................................................ 382/103
See application file for complete search history.

(56) References Cited

U.S. PATENT DOCUMENTS

| 7,728,839 | B2 * | 6/2010 | Yang et al. ................. 345/474 |
| 2003/0065409 | A1 | 4/2003 | Raeth et al. |
| 2007/0035622 | A1 | 2/2007 | Hanna et al. |
| 2013/0039534 | A1 * | 2/2013 | Shih-Chia et al. ............ 382/103 |

FOREIGN PATENT DOCUMENTS

CN 101017573 8/2007

OTHER PUBLICATIONS

Lin, Ruei-Sung, Yang, Ming-Hsuan, Levinson, Stephen E. "Object Tracking Using Incremental Fisher Discriminant Analysis" Proceedings of the 17th International Conference on Pattern Recognition. 2004.*
Er, Meng Joo, Wum Shiqian, Lu, Juwei, Toh, Hock Lye. "Face Recognition with Radial Basis Function (RBF) Neural Networks" IEEE Transactions on Neural Networks vol. 13 No. 3 May 2002.*
Dongxiang Zhou and Hong Zhang, "Modified GMM Background Modeling and Optical Flow for Detection of Moving Objects," IEEE International Conference on Systems, Man and Cybernetics, Oct. 10-12, 2005, pp. 1-6.

(Continued)

Primary Examiner — Kim Vu
Assistant Examiner — Molly Delaney
(74) Attorney, Agent, or Firm — Jianq Chyun IP Office

(57) ABSTRACT

A method for moving object detection based on a Fisher's Linear Discriminant-based Radial Basis Function Network (FLD-based RBF network) includes the following steps. A sequence of incoming frames of a fixed location delivered over a network are received. A plurality of discriminant patterns are generated from the sequence of incoming frames based on a Fisher's Linear Discriminant (FLD) model. A background model is constructed from the sequence of incoming frames based on a Radial Basis Function (RBF) network model. A current incoming frame is received and divided into a plurality of current incoming blocks. Each of the current incoming blocks is classified as either a background block or a moving object block according to the discriminant patterns. Whether a current incoming pixel of the moving object blocks among the current incoming blocks is a moving object pixel or a background pixel is determined according to the background model.

16 Claims, 6 Drawing Sheets

(56) References Cited

OTHER PUBLICATIONS

Ahmed Elgammal, et al., "Background and Foreground Modeling Using Nonparametric Kernel Density Estimation for Visual Surveillance," Proceedings of the IEEE, vol. 90, No. 7, Jul. 2002, pp. 1-13.
Antoine Manzanera and Julien C. Richefeu, "A new motion detection algorithm based on Σ-Δ background estimation," Elsevier Science, Aug. 21, 2007, pp. 1-12.
Jong-Eun Ha and Wang-Neon Lee, "Foreground objects detection using multiple difference images," Optical Engineering, Apr. 2010, pp. 1-5.
A. Manzanera and J. C. Richefeu, "A robust and computationally efficient motion detection algorithm based on Σ-Δ background estimation.," Proceedings of the Fourth Indian Conference on Computer Vision, Graphics & Image Processing, Dec. 16-18, 2004 , pp. 1-6.
Mustafa Oral and Umut Deniz, "Centre of mass model—A novel approach to background modelling for segmentation of moving objects," Image and Vision Computing, Oct. 3, 2006, pp. 1-12.
Shih-Chia Huang and Bo-Hao Chen, "Automatic Moving Object Extraction Through a Real World Variable-Bandwidth Network for Traffic Monitoring Systems," IEEE Transactions on Industrial Electronics, Apr. 2014, pp. 1-14.
"Office Action of Taiwan Counterpart Application", issued on Jul. 8, 2015, p. 1-p. 4.

* cited by examiner

METHOD AND APPARATUS FOR MOVING OBJECT DETECTION USING FISHER'S LINEAR DISCRIMINANT BASED RADIAL BASIS FUNCTION NETWORK

INCORPORATION BY REFERENCE

This application is based upon the disclosure of the paper titled *Automatic Moving Object Extraction Through a Real World Variable-Bandwidth Network for Traffic Monitoring Systems* which will be published in IEEE Transactions on Apr. 1, 2014. The aforementioned paper is incorporated by reference for all purposes.

TECHNICAL FIELD

The present disclosure generally relates to a method and an apparatus for moving object detection using Fisher's Linear Discriminant-based Radial Basis Function Network (FLD-based RBF network).

BACKGROUND

During recent years, video image detection systems have been proposed in various applications for identifying and tracking moving objects. In particular, wireless video surveillance which uses automatic detection to track a moving object has been a key technology in the management of intelligent surveillance systems. Within the field of traffic management as an example, video image detection techniques have been deployed in intelligent transportation systems (ITS) for the purpose of optimizing traffic flow. By accurately distinguishing vehicles from background objects, an intelligent transportation system may obtain the current traffic volume along a road or even detect and track a particular vehicle.

The conventional moving object detection methods may be classified into three main approaches: temporal differencing, optical flow, and background subtraction.

In the temporal differencing, the regions of motion may be detected based on pixel-wise differences between successive frames in a video stream. Such technique may be adaptive to dynamic scene changes, and yet it has a tendency to incompletely extract the shapes of moving objects, particularly when the objects are motionless.

The optical flow technique may estimate the flow vectors of moving objects based on partial derivatives with respect to temporal and spatial coordinates from brightness values between successive frames in a video stream. Unfortunately, such technique may be sensitive to noise and inefficient for traffic applications due to computational burden.

Background subtraction has been a commonly used technique on video surveillance and target recognitions. In the background subtraction technique, moving foreground objects are able to be segmented from stationary or dynamic background scenes by comparing the pixel differences between the current image and a reference background model of the previous image. The background subtraction technique has been the most satisfactory method for motion detection.

Many variations of the background subtraction method have been proposed to detect moving vehicles within video sequences in an ideal bandwidth network environment. An $\Sigma$-$\Delta$ filter technique has been used in the Sigma Difference Estimation (SDE) approach for estimating two orders of temporal statistics for each pixel in a sequence in accordance with a pixel-based decision framework. Unfortunately, using the SDE approach may be insufficient for complete object detection in certain complex environments. In an attempt to remedy this problem, the Multiple SDE (MSDE) approach which combines multiple $\Sigma$-$\Delta$ estimators to calculate a hybrid background model has been developed. Besides the $\Sigma$-$\Delta$ filter technique, the Gaussian Mixture Model (GMM) has been widely used for robustly modeling backgrounds. Each pixel value is modeled independently in one particular distribution. The subsequent distribution of each pixel is determined based on whether or not it belongs to the background. The Kernel Density Estimation (KDE) method builds a background histogram by aggregating a value set obtained from the recent past of the pixel. However, this creates considerable requirements for the corresponding samples as well as computational expenses. On the other hand, a simple background model is derived by the Simple Statistical Difference (SSD) method using the temporal average as the main criteria to accomplish the detection of moving vehicles. The Multiple Temporal difference (MTD) method retains several previous reference frames with which to calculate the differences between each frame. This, in turn, shrinks gaps within the moving objects.

Unfortunately, video communication over real-world networks with limited bandwidth may frequently suffer from network congestions or bandwidth instabilities. This may be especially problematic when transmitting video information over wireless video communication systems. When data traffic congestions occur in a communication network, most users could tolerate a streaming video with a reduced quality rather than a video which lags or stands still. Therefore, a rate control scheme has been introduced as an effective video-coding tool for controlling the bit rate of video streams. To allocate the available amount of network bandwidth and produce variable bit-rate video streams, a rate control scheme would be used with the assistance of using H.264/AVC as an effective implement for video coding. With suitable allocation of bit-rate video streams, video stream transmission becomes more amenable to systems. Variable bit-rate video streams could be produced which allows robust transmission in wireless communication systems.

Nonetheless, although the rate-control scheme may increase the efficiency of video stream transmission over networks with limited bandwidth, its tendency to continuously change the bit rate decreases the ease of detecting moving objects. Hence, the aforementioned state-of-the-art background subtraction methods in variable bit-rate video streams generally may not produce satisfactory detection results.

For example, FIGS. 1(*a*) and 1(*b*) show a same streaming video captured by a camera and transmitted over a wireless network. FIG. 1(*a*) is a frame numbered 11 and has a bit-rate of 1,000,000 pixels per second, and FIG. 1(*b*) is a frame numbered 207 and has a bit-rate of 20,000 pixels per second. FIG. 1(*a*) illustrates a pixel 101 of a tree on a road, and FIG. 1(*b*) illustrates the same pixel 102 of the subsequent frame of a moving vehicle and the tree along the road. FIG. 1(*c*) shows a comparison among data of the same pixel from which its intensity variations in luminance (Y) component as time progresses. In this scenario, after the bit-rate is switched from a high-quality signal to a low-quality signal, the pixel value fluctuation would often disappear and the pixel value indicating a moving object 103 such as a moving vehicle would often be misinterpreted as a background object by using a conventional background subtraction technique.

For another example, FIG. 2(*a*) is a frame numbered 725 and has a bit-rate of 20,000 pixels per second, and FIG. 2(*b*) is a frame numbered 1328 and has a bit-rate of 1,000,000 pixels per second. FIG. 2(*a*) illustrates a pixel 201 of a tree along a road, and FIG. 2(*b*) illustrates the same pixel 202 of the subsequent frame of the tree along the road. FIG. 2(c) illustrates a comparison among data of the same pixel from which its intensity variations in luminance (Y) component as time progresses. In this scenario, when the network bandwidth is sufficient, the rate control scheme would typically increase a low bit-rate video stream to high bit-rate video stream in order to match the available network bandwidth. The background pixel value fluctuation 203 would often be misinterpreted as a moving object under a conventional background subtraction technique.

In response to the aforementioned problem of misidentification resulted from fluctuating qualities of video stream transmission, a new scheme of moving object detection method is proposed in order to enhance the accuracy of image detection under the circumstance of having variation in bit-rate video streams.

SUMMARY

Accordingly, the present disclosure is directed to a method and an apparatus for moving object detection using Fisher's Linear Discriminant-based Radial Basis Function Network (FLD-based RBF network), and the present disclosure is able to distinguish a moving object in variable bit-rate video streams in an efficient manner.

The present disclosure is directed to a moving object detection method based on a Fisher's Linear Discriminant-based Radial Basis Function Network (FLD-based RBF network). The method includes the following steps: receiving a sequence of incoming frames of a fixed location delivered over a network; generating a plurality of discriminant patterns from the sequence of incoming frames based on a Fisher's Linear Discriminant (FLD) model, where the FLD model comprises an optimal projection vector; constructing a background model from the sequence of incoming frames based on a Radial Basis Function (RBF) network model, where the RBF network model includes an input layer having a plurality of input layer neurons, a hidden layer having a plurality of hidden layer neurons, and an output layer having an output layer neuron, and where there exists a weight between each of the hidden layer neurons and the output layer neuron; receiving a current incoming frame delivered over the network and dividing the current incoming frame into a plurality of current incoming blocks; classifying each of the current incoming blocks as either a background block or a moving object block according to the discriminant patterns; and determining whether a current incoming pixel of the moving object blocks among the current incoming blocks is a moving object pixel or a background pixel according to the background model.

According to an exemplary embodiment of the present disclosure, the step of generating the discriminant patterns from the sequence of incoming frames based on the FLD model includes: dividing each of the incoming frames into a plurality of training blocks and classifying the training blocks into a plurality of classes; calculating a between-class scatter matrix and a within-class scatter matrix according to the training blocks; calculating the optimal projection vector by maximizing the ratio of the within-class scatter matrix and the between-class scatter matrix; and obtaining each of the discriminant patterns according to the optimal projection vector and the corresponding training block.

According to an exemplary embodiment of the present disclosure, the formulas for generating the discriminant patterns from the sequence of incoming frames based on the FLD model include Eq.(1)-Eq.(5):

$$S_B = \sum_{i=1}^{c} n_i(u_i - u)(u_i - u)^T, \quad \text{Eq. (1)}$$

$$S_W = \sum_{i=1}^{c} \sum_{x_k \in x_i} (x_k - u_i)(x_k - u_i)^T, \quad \text{Eq. (2)}$$

where $S_B$ is the between-class scatter matrix, $S_W$ is the within-class scatter matrix, u and $u_i$ represent a mean training block of all the classes and a mean training block of the $i^{th}$ class respectively, $n_i$ represents the number of the training blocks in the $i^{th}$ class, $x_k$ represents the $k^{th}$ block in the $i^{th}$ class, c represents the number of all the classes, c is a positive integer and r<c, $$W_{opt} = \arg\max_W \frac{|W^T S_B W|}{|W^T S_W W|} = [w_1, w_2, \ldots, w_r] \quad \text{Eq. (3)}$$

where $W_{opt}$ is the optimal projection vector, and k, $[w_1, w_2, \ldots, w_r]$ represents a set of generalized eigenvectors of $S_B$ and $S_W$, $$S_B W_i = \lambda_i S_W W_i, \quad \text{Eq.(4)}$$

where $\lambda_i$ represents the $i^{th}$ generalized eigenvalue, i=1, 2, ... r, r is an empirical lower-dimensional value, r is a positive integer and r<c, and $$V_{dpk} = W_{opt}^T x_k \quad \text{Eq.(5)}$$

where $V_{dpk}$ is the discriminant pattern corresponding to the $k^{th}$ training block $x_k$, and $W_{opt}^T$ is the transposition of $W_{opt}$.

According to an exemplary embodiment of the present disclosure, the step of constructing the background model from the sequence of incoming frames based on the RBF network model includes: calculating a difference between an intensity value of each training pixel of the sequence of incoming frames and a background candidate corresponding to each of hidden layer neurons; determining if the difference exceeds a first threshold value; if yes, updating the corresponding training pixel as a new background candidate of the corresponding hidden layer neuron; if no, activating the corresponding hidden layer neuron by a learning rate; and updating the weight between each of the hidden layer neurons and the output layer neuron according to the difference by an empirical learning rate.

According to an exemplary embodiment of the present disclosure, the formulas for constructing the background model from the sequence of incoming frames based on the RBF network model include Eq.(6)-Eq.(9):

$$D(p_t(x,y),B(x,y)_j) = \|p_t(x,y) - B(x,y)_j\| \quad \text{Eq.(6)}$$

where j=1, ... M, and M indicates the quantity of the hidden layer neurons and is a positive integer greater than 1, $p_t(x,y)$ is the intensity value of the $i^{th}$ training pixel, $B(x,y)_j$ is the background candidate corresponding to the $j^{th}$ hidden layer neuron, and $D(p_t(x,y),B(x,y)_j)$ denotes as an Euclidean distance between $p_t(x,y)$ and $B(x,y)_j$, $$p_t(x, y) \begin{cases} \notin B(x, y)_j & \text{if } D(p_t(x, y), B(x, y)_j) \geq \varepsilon \\ \in B(x, y)_j & \text{otherwise} \end{cases} \quad \text{Eq. (7)}$$

where $\varepsilon$ is the first threshold value, $$B(x,y)'_j = B(x,y)_j + \alpha[p_t(x,y) - B(x,y)_j] \quad \text{Eq.(8)}$$

where α is the learning rate with a non-zero value, $B(x,y)_j$ is the original background candidate corresponding to the $j^{th}$ hidden layer neuron, and $B(x,y)'_j$ is the activated hidden layer neuron corresponding to the $j^{th}$ hidden layer neuron, and $$W(x,y)'_j = W(x,y)_j + \beta[F - W(x,y)_j] \cdot D(p_t, B_j) \quad \text{Eq.(9)}$$

where $W(x,y)'_j$ is the updated weight between the $j^{th}$ hidden layer neuron and the output neuron, $W(x,y)_j$ is the original weight between the $j^{th}$ hidden layer neuron and the output neuron, β is the empirical learning rate with a non-zero value, F is an output value of the output neuron at (x,y).

According to an exemplary embodiment of the present disclosure, the step of classifying each of the current incoming blocks as either the background block or the moving object block according to the discriminant patterns includes: calculating a projection of each of the current incoming blocks according to the optimal projection vector; calculating a similarity level between the discriminant pattern and the projection of each of the current incoming blocks; determining if the similarity level exceeds the second threshold value; if yes, classifying the current incoming block as the background block; and if no, classifying the current incoming block as the moving object block.

According to an exemplary embodiment of the present disclosure, the formulas for classifying each of the current incoming blocks as either the background block or the moving object block according to the discriminant patterns include Eq.(10)-Eq.(11):

$$V_k = W_{opt}^T b_k, \quad \text{Eq.(10)}$$

where $V_k$ is the projection of the $k^{th}$ current incoming block $b_k$, $k=1, \ldots c$, c represents the number of all the classes, $$b_i \in \begin{cases} \text{class 1} & \text{if } \|V_{dpi} - V_i\| > \Delta \\ \text{class 2} & \text{if } \|V_{dpi} - V_i\| \leq \Delta \end{cases} \quad \text{Eq. (11)}$$

where $V_{dpi}$ represents the discriminant pattern in the $i^{th}$ class, $V_i$ represents the projection in the $i^{th}$ class, $b_i$ represents the current incoming block in the $i^{th}$ class, class 1 represents a background class, and class 2 represents a moving object class.

According to an exemplary embodiment of the present disclosure, the step of determining whether the current incoming pixel of the moving object blocks among the current incoming blocks is the moving object pixel or the background pixel according to the background model includes: designating the current incoming pixel as an input vector to the input layer; propagating the current incoming pixel to the hidden layer neurons and generating a hidden layer output of each of the hidden layer neurons according to a basis function; obtaining an output layer output corresponding to the current incoming pixel according to the hidden layer output and the weight between each of the hidden layer neurons and the output layer neuron; determining if the output layer output is less than a third threshold value; if yes, determining that the current incoming pixel is the moving object pixel; and if no, determining that the current incoming pixel is the background object pixel.

According to an exemplary embodiment of the present disclosure, the formulas for determining whether the current incoming pixel of the moving object blocks among the current incoming blocks is the moving object pixel or the background pixel according to the background model include Eq.(12)-(14):

$$Z_j(p_t) = \phi(\|p_t - C_j\|), \quad \text{Eq.(12)}$$

where $j=1, \ldots, M$, and M indicates the quantity of the hidden layer neurons and is a positive integer greater than 1, $C_j$ is the $j^{th}$ hidden layer neuron, $p_t$ is the current incoming pixel of the moving object blocks among the current incoming blocks, $\phi(\bullet)$ is the basis function, and $\|p_t - C_j\|$ represents the Euclidean distance between $p_t$ and $C_j$, $$F(p_t) = \sum_{j=1}^{M} W_j Z_j(p_t), \quad \text{Eq. (13)}$$

where $Z_j$ represents the $j^{th}$ hidden layer output, $W_j$ represents the weight between the $j^{th}$ hidden layer neuron and the output layer neuron, and $F(p_t)$ represents the output layer output, $$Y(p_t) = \begin{cases} 1, & \text{if } F(p_t) < \delta \\ 0, & \text{otherwise} \end{cases} \quad \text{Eq. (14)}$$

where δ is the third threshold value, and $Y(p_t)$ represents the moving object pixel when it is labelled as '1'.

According to an exemplary embodiment of the present disclosure, the basis function is a Gaussian function, where the Gaussian function is written as Eq.(12.1):

$$\phi(\|p_t - C_j\|) = \exp\left(-\frac{\|p_t - C_j\|^2}{2\sigma^2}\right), \quad \text{Eq. (12.1)}$$

where σ is an empirical tolerance with a positive value.

The present disclosure is directed to a moving object detection apparatus including a processing unit and a storage unit, where the processing unit is coupled to the storage unit and is configured for: receiving a sequence of incoming frames of a fixed location delivered over a network; generating a plurality of discriminant patterns from the sequence of incoming frames based on a Fisher's Linear Discriminant (FLD) model, where the FLD model comprises an optimal projection vector; constructing a background model from the sequence of incoming frames based on a Radial Basis Function (RBF) network model, where the RBF network model includes an input layer having a plurality of input layer neurons, a hidden layer having a plurality of hidden layer neurons, and an output layer having an output layer neuron, and where there exists a weight between each of the hidden layer neurons and the output layer neuron; receiving a current incoming frame delivered over the network and dividing the current incoming frame into a plurality of current incoming blocks; classifying each of the current incoming blocks as either a background block or a moving object block according to the discriminant patterns; and determining whether a current incoming pixel of the moving object blocks among the current incoming blocks is a moving object pixel or a background pixel according to the background model.

According to an exemplary embodiment of the present disclosure, the processing unit is configured for generating the discriminant patterns from the sequence of incoming frames based on the FLD model including: dividing each of the incoming frames into a plurality of training blocks and classifying the training blocks into a plurality of classes; calculating a between-class scatter matrix and a within-class scatter matrix according to the training blocks; calculating the optimal projection vector by maximizing the ratio of the within-class scatter matrix and the between-class scatter matrix; and obtaining each of the discriminant patterns according to the optimal projection vector and the corresponding training block.

According to an exemplary embodiment of the present disclosure, the processing unit is configured for generating the discriminant patterns from the sequence of incoming frames based on the FLD model according to Eq.(1)-Eq.(5):

$$S_B = \sum_{i=1}^{c} n_i (u_i - u)(u_i - u)^T, \qquad \text{Eq. (1)}$$

$$S_W = \sum_{i=1}^{c} \sum_{x_k \in x_i} (x_k - u_i)(x_k - u_i)^T, \qquad \text{Eq. (2)}$$

where $S_B$ is the between-class scatter matrix, $S_W$ is the within-class scatter matrix, u and $u_i$ represent a mean training block of all the classes and a mean training block of the $i^{th}$ class respectively, $n_i$ represents the number of the training blocks in the $i^{th}$ class, $x_k$ represents the $k^{th}$ block in the $i^{th}$ class, c represents the number of all the classes, and c is a positive integer, $$W_{opt} = \underset{W}{\operatorname{argmax}} \frac{|W^T S_B W|}{|W^T S_W W|} = [w_1, w_2, \ldots, w_r] \qquad \text{Eq. (3)}$$

where $W_{opt}$ is the optimal projection vector, and $[w_1, w_2, \ldots, w_r]$ represents a set of generalized eigenvectors of $S_B$ and $S_W$, $$S_B W_i = \lambda_i S_w W_i, \qquad \text{Eq.(4)}$$

where $\lambda_i$ represents the $i^{th}$ generalized eigenvalue, i=1, 2, . . . r, r is an empirical lower-dimensional value, r is a positive integer and r<c, and $$V_{dpk} = W_{opt}^T x_k \qquad \text{Eq.(5)}$$

where $V_{dpk}$ is the discriminant pattern corresponding to the $k^{th}$ training block $x_k$, and $W_{opt}^T$ is the transposition of $W_{opt}$.

According to an exemplary embodiment of the present disclosure, the processing unit is configured for constructing the background model from the sequence of incoming frames based on the RBF network model including: calculating a difference between an intensity value of each training pixel of the sequence of incoming frames and a background candidate corresponding to each of hidden layer neurons; determining if the difference exceeds a first threshold value; if yes, updating the corresponding training pixel as a new background candidate of the corresponding hidden layer neuron; if no, activating the corresponding hidden layer neuron by a learning rate; and updating the weight between each of the hidden layer neurons and the output layer neuron according to the difference by an empirical learning rate.

According to an exemplary embodiment of the present disclosure, the processing unit is configured for constructing the background model from the sequence of incoming frames based on the RBF network model according to Eq.(6)-Eq.(9):

$$D(p_t(x,y), B(x,y)_j) = \|p_t(x,y) - B(x,y)_j\| \qquad \text{Eq.(6)}$$

where j=1, . . . M, and M indicates the quantity of the hidden layer neurons and is a positive integer greater than 1, $p_t(x,y)$ is the intensity value of the $i^{th}$ training pixel, $B(x,y)_j$ is the background candidate corresponding to the $j^{th}$ hidden layer neuron, and $D(p_t(x,y), B(x,y)_j)$ denotes as an Euclidean distance between $p_t(x,y)$ and $B(x,y)_j$, $$p_t(x,y) \begin{cases} \notin B(x,y)_j & \text{if } D(p_t(x,y), B(x,y)_j) \geq \varepsilon \\ \in B(x,y)_j & \text{otherwise} \end{cases} \qquad \text{Eq. (7)}$$

where $\varepsilon$ is the first threshold value, $$B(x,y)'_j = B(x,y)_j + \alpha [p_t(x,y) - B(x,y)_j] \qquad \text{Eq.(8)}$$

where $\alpha$ is the learning rate with a non-zero value, $B(x,y)_j$ is the original background candidate corresponding to the $j^{th}$ hidden layer neuron, and $B(x,y)'_j$ is the activated hidden layer neuron corresponding to the $j^{th}$ hidden layer neuron, and $$W(x,y)'_j = W(x,y)_j + \beta [F - W(x,y)_j] \cdot D(p_t, B_j) \qquad \text{Eq.(9)}$$

where $W(x,y)'_j$ is the updated weight between the $j^{th}$ hidden layer neuron and the output neuron, $W(x,y)$ is the original weight between the $j^{th}$ hidden layer neuron and the output neuron, $\beta$ is the empirical learning rate with a non-zero value, F is an output value of the output neuron at (x,y).

According to an exemplary embodiment of the present disclosure, the processing unit is configured for classifying each of the current incoming blocks as either the background block or the moving object block according to the discriminant patterns including: calculating a projection of each of the current incoming blocks according to the optimal projection vector; calculating a similarity level between the discriminant pattern and the projection of each of the current incoming blocks; determining if the similarity level exceeds the second threshold value; if yes, classifying the current incoming block as the background block; and if no, classifying the current incoming block as the moving object block.

According to an exemplary embodiment of the present disclosure, the processing unit is configured for classifying each of the current incoming blocks as either the background block or the moving object block according to the discriminant patterns according to Eq.(10) and Eq.(11):

$$V_k = W_{opt}^T b_k, \qquad \text{Eq.(10)}$$

where $V_k$ is the projection of the $k^{th}$ current incoming block $b_k$, k=1, . . . c, c represents the number of all the classes, $$b_i \in \begin{cases} \text{class 1} & \text{if } \|V_{dpi} - V_i\| > \Delta \\ \text{class 2} & \text{if } \|V_{dpi} - V_i\| \leq \Delta \end{cases} \qquad \text{Eq. (11)}$$

where $V_{dpi}$ represents the discriminant pattern in the $i^{th}$ class, $V_i$ represents the projection in the $i^{th}$ class, $b_i$ represents the current incoming block in the $i^{th}$ class, class 1 represents a background class, and class 2 represents a moving object class.

According to an exemplary embodiment of the present disclosure, the processing unit is configured for determining whether the pixel of the moving object blocks is the moving object pixel or the background pixel according to the background model including: designating the current incoming pixel as an input vector to the input layer; propagating the current incoming pixel to the hidden layer neurons and generating a hidden layer output of each of the hidden layer neurons according to a basis function; obtaining an output layer output corresponding to the current incoming pixel according to the hidden layer output and the weight between each of the hidden layer neurons and the output layer neuron; determining if the output layer output is less than a third threshold value; if yes, determining that the current incoming pixel is the moving object pixel; and if no, determining that the current incoming pixel is the background object pixel.

According to an exemplary embodiment of the present disclosure, the processing unit is configured for determining whether the pixel of the moving object blocks is the moving object pixel or the background pixel according to the background model according to Eq.(12)-(14):

$$Z_j(p_t) = \phi(\|p_t - C_j\|),  \quad \text{Eq. (12)}$$

where j=1, ... M, and M indicates the quantity of the hidden layer neurons and is a positive integer greater than 1, $C_j$ is the $j^{th}$ hidden layer neuron, $p_t$ is the current incoming pixel of the moving object blocks among the current incoming blocks, $\phi(\bullet)$ is the basis function, and $\|p_t - C_j\|$ represents the Euclidean distance between $p_t$ and $C_j$, $$F(p_t) = \sum_{j=1}^{M} W_j Z_j(p_t), \quad \text{Eq. (13)}$$

where $Z_j$ represents the $j^{th}$ hidden layer output, $W_j$ represents the weight between the $j^{th}$ hidden layer neuron and the output layer neuron, and $F(p_t)$ represents the output layer output, $$Y(p_t) = \begin{cases} 1, & \text{if } F(p_t) < \delta \\ 0, & \text{otherwise} \end{cases} \quad \text{Eq. (14)}$$

where $\delta$ is the third threshold value, and $Y(p_t)$ represents the moving object pixel when it is labelled as '1'.

According to an exemplary embodiment of the present disclosure, the basis function is a Gaussian function, where the Gaussian function is written as Eq.(12.1):

$$\phi(\|p_t - C_j\|) = \exp\left(-\frac{\|p_t - C_j\|^2}{2\sigma^2}\right), \quad \text{Eq. (12.1)}$$

where $\sigma$ is an empirical tolerance with a positive value.

In view of the aforementioned descriptions, the present disclosure is able to accurately discern a moving object from a background in video streams of variable bit-rates over real-world networks with limited bandwidth which feature realistic situations through a FLD-based RBF network model in an efficient manner.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed. It also should be understood, that the summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
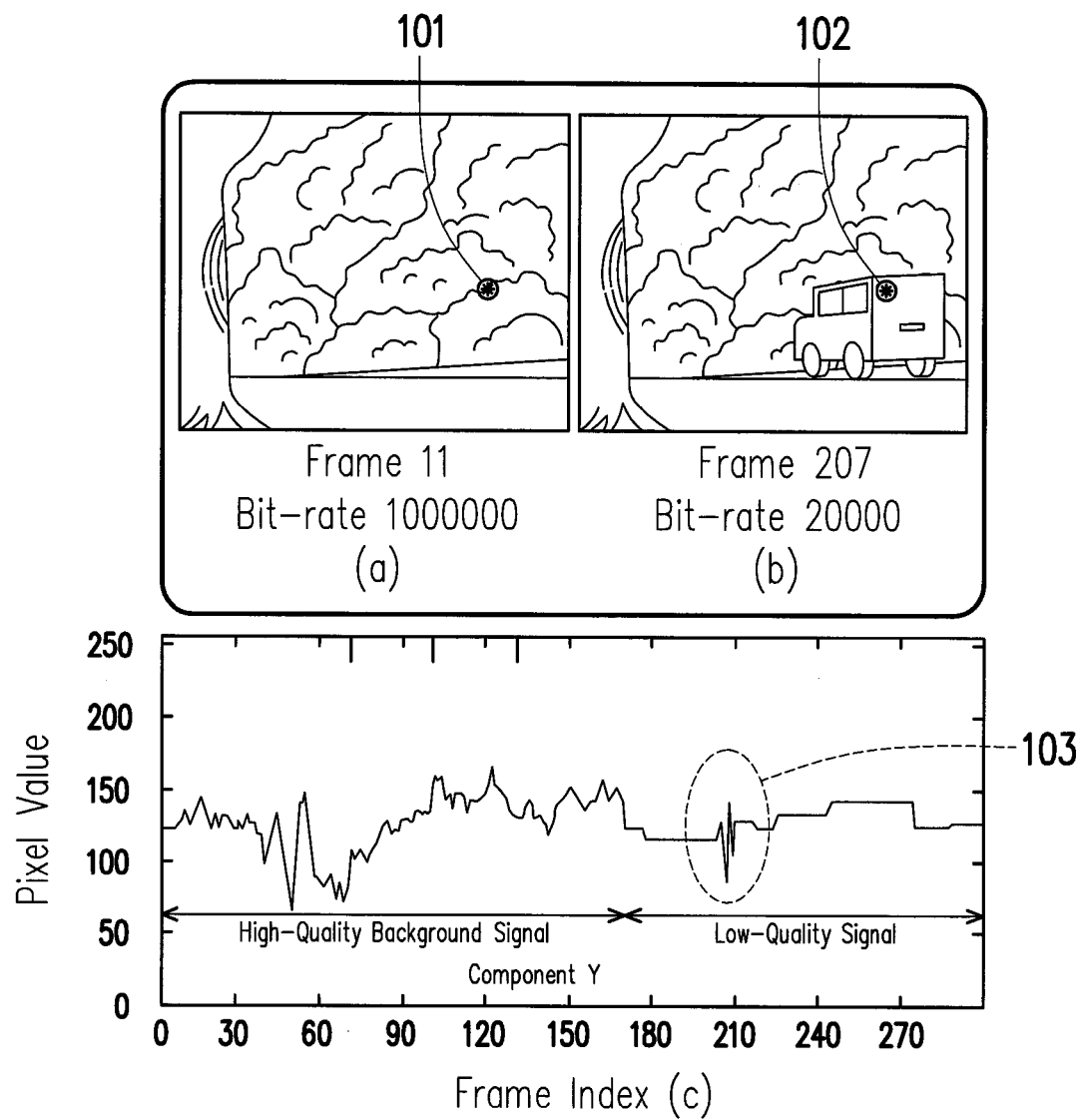
FIG. 1(a)-FIG. 1(c) illustrate an exemplary scenario in which intensity variations of a same pixel has shifted from having a low bit-rate to a high bit-rate in a video stream.
Figure 2:
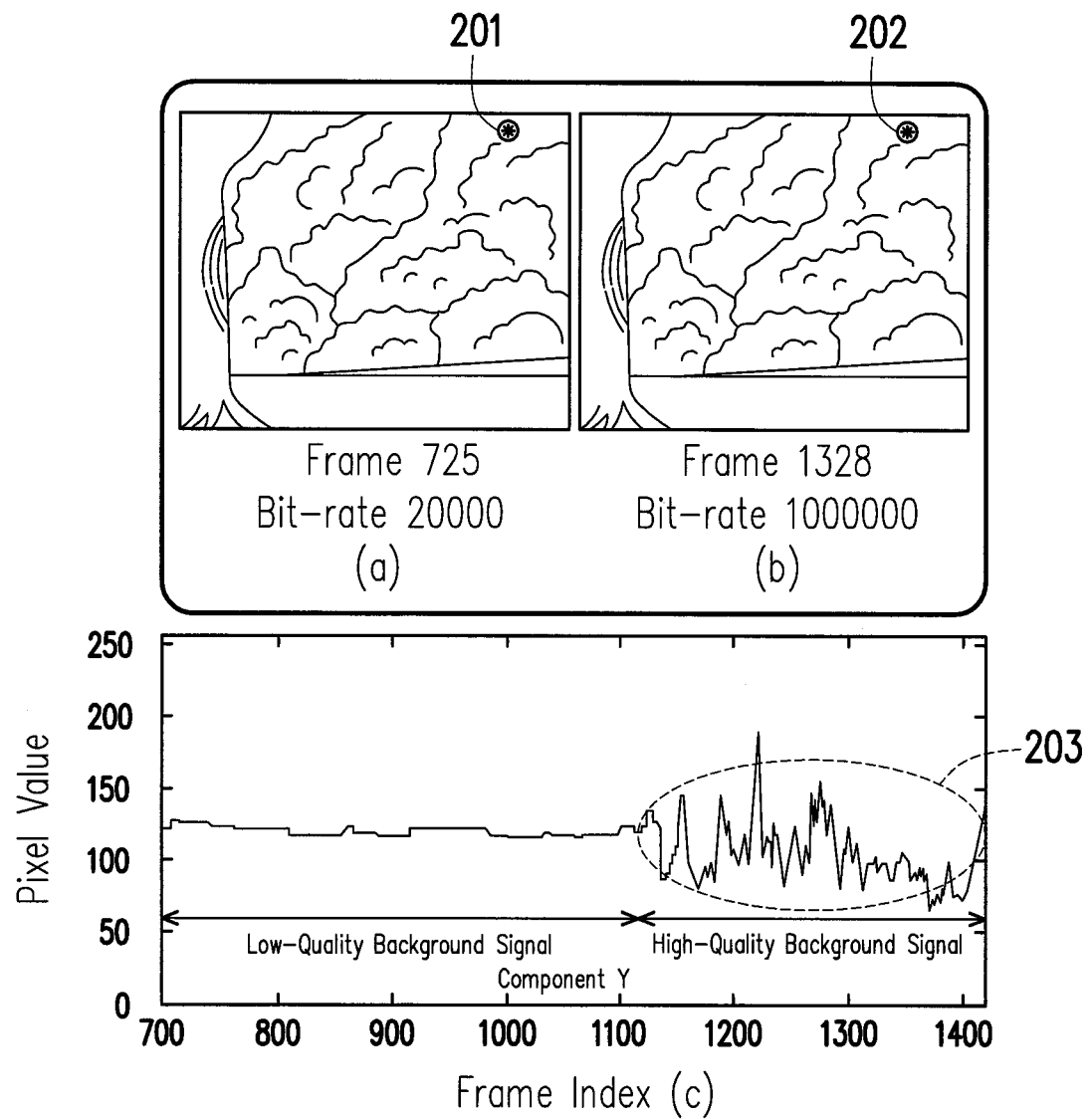
FIG. 2(a)-FIG. 2(c) illustrate an exemplary scenario in which intensity variations of a same pixel has shifted from having a high bit-rate to a low bit-rate in a video stream.

Reference will now be made in detail to the present embodiments of the disclosure, examples of which are illustrated in the accompanying drawings. Wherever possible, the same reference numbers are used in the drawings and the description to refer to the same or like parts.

Figure 3:
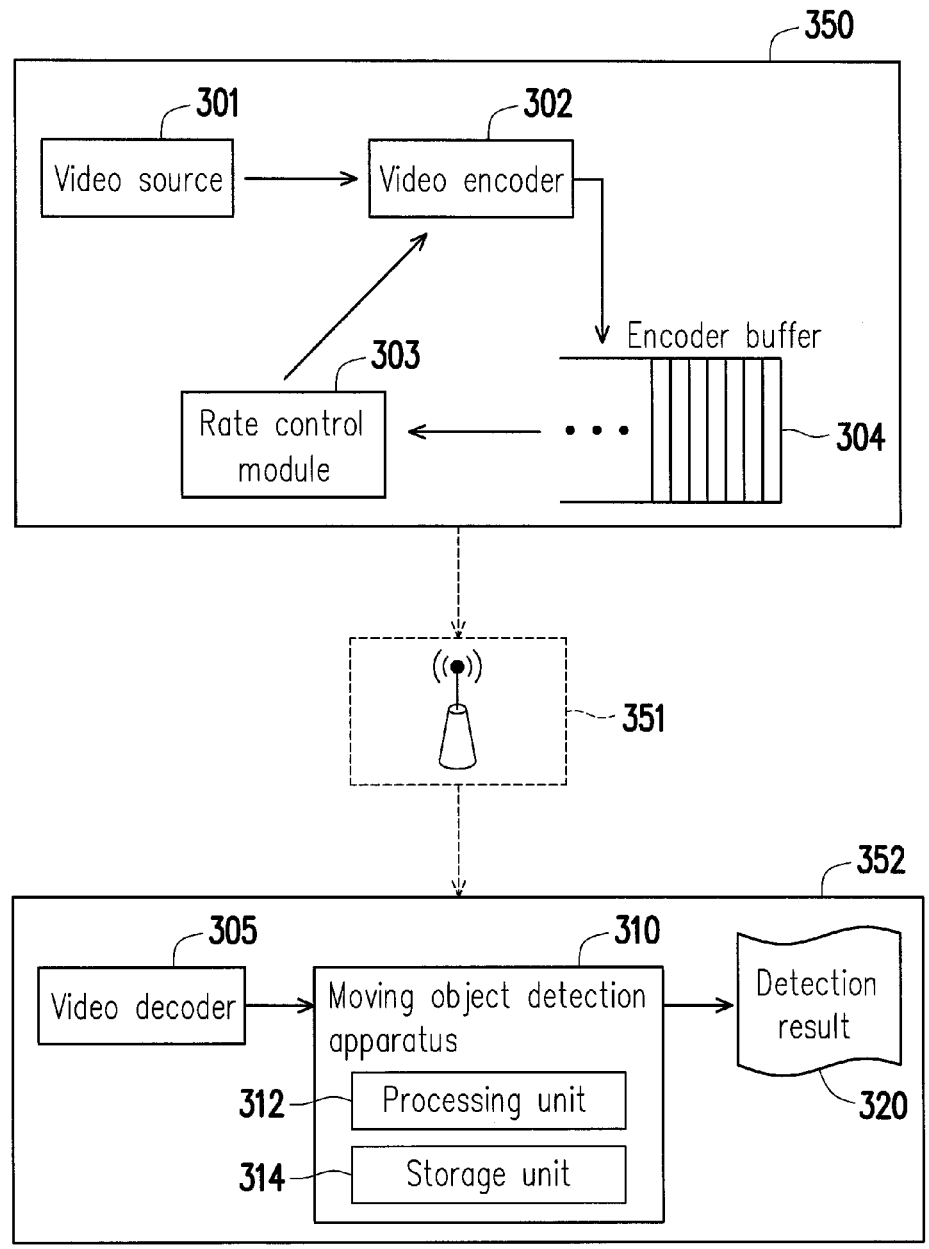
FIG. 3 illustrates an exemplary system architecture which utilizes the proposed method from the hardware perspective in accordance with one of the exemplary embodiments of the present disclosure.

FIG. 3 illustrates an exemplary system architecture which utilizes the proposed moving object detection method from the hardware perspective in accordance with one of the exemplary embodiments of the present disclosure. A typical system for moving object detection could be deployed in a traffic management system to detect traffic volume or a particular vehicle or could be deployed in an airport or shopping center for security purposes. The exemplary system of FIG. 3 may include a recording platform 350 and an analysis platform 352. The recording platform 350 may include a video source 301 which is an apparatus for capturing videos or motion pictures such as one or more surveillance cameras. The video source 301 would output captured raw footage to a video encoder 302 which would typically be controlled by a rate control module 303. The video encoder 302 would output encoded video to an encoder buffer 304 which would interact with the rate control module 303 to control the video encoder 302. The recording platform 350 would then output encoded videos to a network 351 by going through a wireless connection or a cable connection. The network 351 could be a 3G or LTE network connected to a core network, or the network could be an intranet or a private network. The encoded videos would then be received by the analysis platform 352. The analysis platform 352 would include a video decoder 305 which decodes received encoded videos from the network 351 through a transceiver, and the decoded videos would then be transferred to a moving object detection apparatus 310 which would then output analyzed detection result 320.

It should be mentioned that the moving object detection apparatus 310 would typically be performed as a part of the video encoder 302 within the recording platform 350; however the present disclosure would favor the moving object detection apparatus 310 being implemented after the video decoder 305. The advantage of doing so is that the moving object detection method could be performed for video of any specifications as opposed to videos having to adhere to a particular type of specification. The moving object detection apparatus 310 could be an electronic device having a processing unit 312 and a storage unit 314. The processing unit 312 is one or a combination of a central processing unit (CPU), a programmable general- or specific-purpose microprocessor, a digital signal processor (DSP), a programmable controller, application specific integrated circuits (ASIC), a programmable logic device (PLD), or any other similar devices. The storage unit 314 is one or a combination of a stationary or mobile random access memory (RAM), read-only memory (ROM), flash memory, hard disk, or any other similar devices. The processing unit 312 is coupled to the storage unit 314, where the processing unit 312 would be used to perform the moving object detection method as proposed, and the storage unit 314 would provide a temporary or permanent storage mean for the analysis platform 352.

Figure 4:
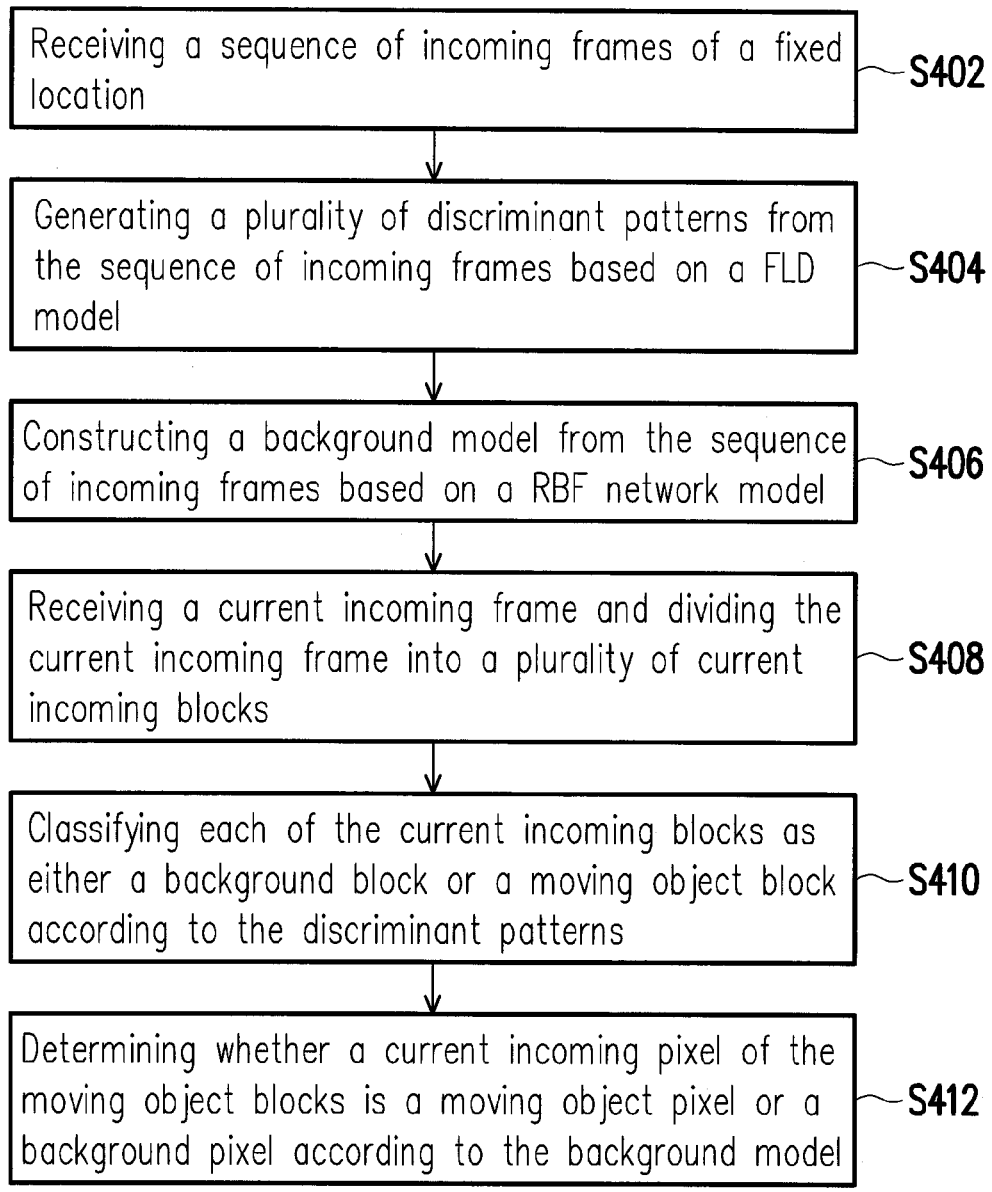
FIG. 4 illustrates a flowchart of a moving objection detection method in accordance with one of the exemplary embodiments of the present disclosure.

FIG. 4 illustrates a flowchart of a moving objection detection method in accordance with one of the exemplary embodiments of the present disclosure. The method proposed in the present embodiment may be performed by the moving object detection apparatus 310 of FIG. 3.

Referring to both FIG. 3 and FIG. 4, the processing unit 312 of the moving object detection apparatus 310 may receive a sequence of incoming frames of a fixed location (Step S402). In other words, an input of an original video frames sequence (i.e. decoded video sequence obtained from the video decoder 305) would be received by the processing unit 312. For any particular spot where images are continuously being captured, the background could be assumed to be fixed.

In the present embodiment, the proposed method is built in $YC_bC_r$ color space via three variables regarding perception with which to provide support for most digital video applications. The three variables are luminance (Y), blue-difference chroma ($C_b$), and red-difference chroma ($C_r$). Accordingly, the color element of a pixel uses Y, $C_b$ and $C_r$ values together to represent the intensity and the color of each pixel in each of the incoming frames.

In order to provide for variable bit-rate video stream properties, it is necessary to produce lower-dimensional discriminant patterns from the high-dimensional block image-space to a significantly lower-dimensional feature space to present the variable bit-rate video stream properties. This may be achieved through the use of optimal projection vectors by leveraging the Fisher's Linear Discriminant (FLD) technique from the continual influx of incoming frames in a discriminant pattern extraction operation. The optimal projection vectors may be obtained through a procedure which maximizes the ratio of a between-class scatter and a within-class scatter. Hence, the processing unit 312 may generate a plurality of discriminant patterns from the sequence of incoming frames based on a Fisher's Linear Discriminant (FLD) model (Step S404, referred to as "the discriminant pattern extraction operation").

To be more detailed, the processing unit 312 may first divide each of the incoming frames into N×N training blocks, where the $k^{th}$ training block is classified as the $i^{th}$ class. The processing unit 312 may calculate a between-class scatter matrix $S_B$ and a within-class scatter matrix $S_W$ according to Eq.(1) and Eq.(2) respectively:

$$S_B = \sum_{i=1}^{c} n_i(u_i - u)(u_i - u)^T, \quad \text{Eq. (1)}$$

$$S_W = \sum_{i=1}^{c} \sum_{x_k \in x_i} (x_k - u_i)(x_k - u_i)^T, \quad \text{Eq. (2)}$$

where u and $u_i$ represent a mean training block of all the classes and a mean training block of the $i^{th}$ class respectively; $n_i$ represents the number of the training blocks in the $i^{th}$ class; $x_k$ represents the $k^{th}$ training block in the $i^{th}$ class; c represents the number of all the classes; N and c are positive integers. The block size N may be empirically set to 16.

The processing unit 312 may then calculate the optimal projection vector $W_{opt}$ by maximizing the ratio of the within-class scatter and the between-class scatter. This may be expressed as Eq.(3):

$$W_{opt} = \arg\max_W \frac{|W^T S_B W|}{|W^T S_W W|} = [w_1, w_2, \ldots, w_r] \quad \text{Eq. (3)}$$

where $[w_1, w_2, \ldots, w_r]$ represents a set of generalized eigenvectors of $S_B$ and $S_W$. Furthermore, it could be inferred from Eq.(3) that there exists an equation which may be expressed as Eq.(4):

$$S_B W_i = \lambda_i S_W W_i, \quad \text{Eq.(4)}$$

where $\lambda_i$ represents the $i^{th}$ generalized eigenvalue, i=1, 2, ... r, and r is an empirical lower-dimensional value and thus r<c.

Thus, the processing unit 312 may obtain each of the lower-dimensional discriminant patterns according to the optimal projection vector and the corresponding training block based on Eq.(5):

$$V_{dpk} = W_{opt}^T x_k \quad \text{Eq.(5)}$$

where $V_{dpk}$ is the discriminant pattern corresponding to the $k^{th}$ training block $x_k$, and $W_{opt}^T$ is the transposition of $W_{opt}$.

After the lower-dimensional discriminant patterns are generated through the discriminant pattern extraction operation based on the aforementioned FLD model, a reliable background model may be established through a precise background model operation based on a Radial Basis Function (RBF) network model to memorize the variable bit-radio video stream properties. The information with communicated impulse is then relayed to neurons in the hidden layer of the RBF network. Such combined architecture is referred to as the FLD-based RBF network.

Figure 5:
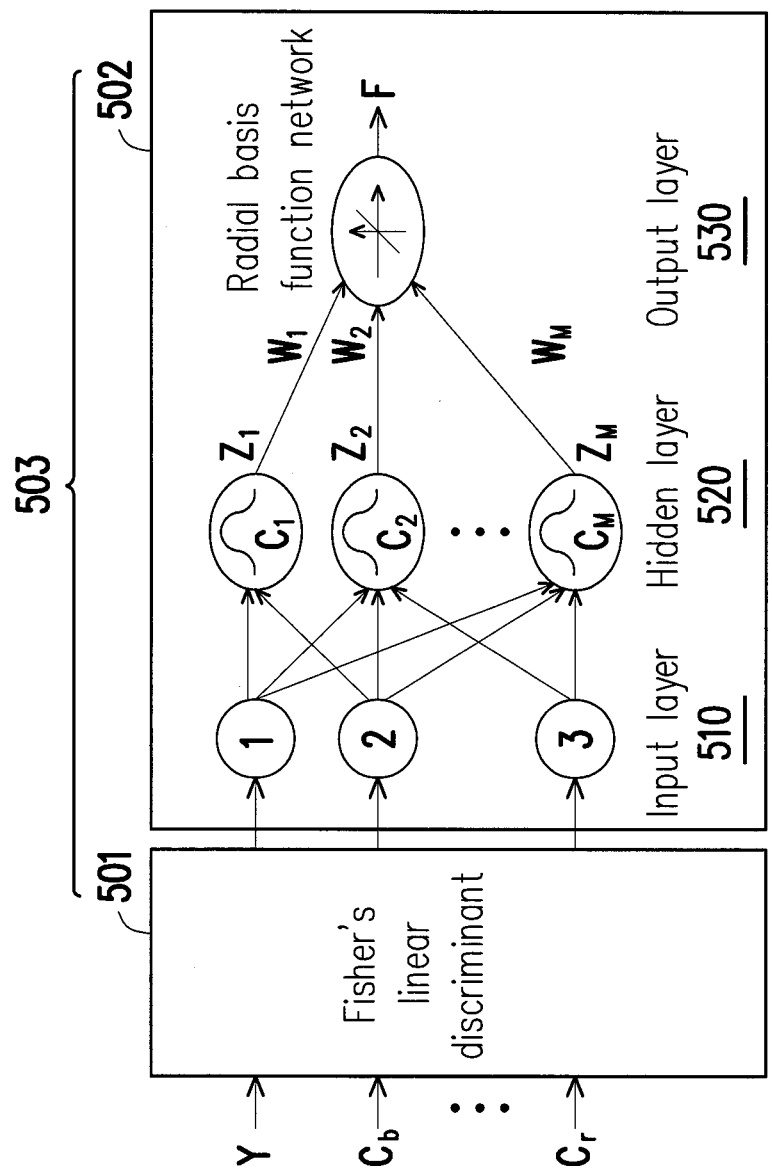
FIG. 5 illustrates a architecture of a FLD-based RDF network in accordance with one of the exemplary embodiments of the present disclosure.

To be specific, the processing unit 312 may construct a background model from the sequence of incoming frames based on a Radial Basis Function Network (RBF network) model (Step S406, referred to as "the precise background model operation"). The architecture of the RBF network model 502 constructed after the FLD model 501 would include an input layer 510, a hidden layer 520, and an output layer 530 as illustrated in FIG. 5, where the combined FLD model 501 and RBF network model 502 are referred to as a FLD-based RBF network model 503. In the present embodiment, the input layer 510 includes three neurons, referred to as input layer neurons. The hidden layer 520 includes M neurons, referred to as hidden layer neurons, where M is a positive integer greater than 1. The output layer 530 includes one neuron, referred to as an output layer neuron. There exists a weight $w_1, w_2, \ldots w_M$ between each of the hidden layer neurons and the output layer neuron.

The main goal of the precise background model operation is to construct a reliable background model for memorization of the variable bit-rate video stream properties in the hidden layer of the RBF network model. To create such reliable background model, the processing unit 312 may first calculate the difference between an intensity value of each training pixel $p_t(x,y)$ of the sequence of incoming frames and a background candidate corresponding to each of the hidden layer neurons $B(x,y)_j, \ldots B(x,y)_M$. In the present embodiment, the processing unit 312 may calculate the difference based on the Euclidean distance as represented by Eq.(6):

$$D(p_t(x,y), B(x,y)_j) = \|p_t(x,y) - B(x,y)_j\| \quad \text{Eq.(6)}$$

where j=1, ... M, $p_t(x,y)$ is the intensity value of the $i^{th}$ training pixel; $B(x,y)_j$ is the background candidate corresponding to the $j^{th}$ hidden layer neuron; $D(p_t(x,y),B(x,y)_j)$ denotes as an Euclidean distance between $p_t(x,y)$ and $B(x,y)_j$.

When the processing unit 312 determines that the difference $D(p_t(x,y),B(x,y)_j)$ exceeds a first threshold value $\epsilon$, the corresponding training pixel $p_t(x,y)$ is regarded as a new background candidate of the corresponding hidden layer neuron $B(x,y)_j$. Such decision rule may be represented by Eq.(7):

$$p_t(x,y) \begin{cases} \notin B(x,y)_j & \text{if } D(p_t(x,y), B(x,y)_j) \geq \epsilon \\ \in B(x,y)_j & \text{otherwise} \end{cases} \quad \text{Eq. (7)}$$

When the processing unit 312 determines that the distance $D(p_t(x,y),B(x,y)_j)$ does not exceed the first threshold value $\epsilon$, the processing unit 312 may activate the hidden layer neuron $B(x,y)_j$ by a learning rate $\alpha$ with a non-zero value. This may be expressed as Eq.(8):

$$B(x,y)'_j = B(x,y)_j + \alpha[p_t(x,y) - B(x,y)_j] \quad \text{Eq.(8)}$$

where $B(x,y)_j$ is the original background candidate corresponding to the $j^{th}$ hidden layer neuron; $B(x,y)'_j$ is the activated hidden layer neuron corresponding to the $j^{th}$ hidden layer neuron.

Next, the processing unit 312 may update the weight between each of the hidden layer neurons and the output layer neuron by an empirical learning rate $\beta$ as represented by Eq.(9):

$$W(x,y)'_j = W(x,y)_j + \beta[F - W(x,y)_j] \cdot D(p_t, B_j) \quad \text{Eq.(9)}$$

where $W(x,y)'_j$ is the updated weight between the $j^{th}$ hidden layer neuron and the output neuron; $W(x,y)_j$ is the original weight between the $j^{th}$ hidden layer neuron and the output neuron; $\beta$ is the empirical learning rate with a non-zero value; F is an output value of the output layer at (x,y). Note that all the weights are initialized to '1'. This construction approach of the hidden layer and the adjustment of weights may be regarded as an unsupervised learning process in the RBF network.

The discriminant pattern extraction operation in Step S404 and the precise background model operation in Step S406 may be viewed as an adaptive pattern generation stage, where the variable bit-rate video stream properties are accommodated by the FLD-based RBF network. After the adaptive pattern generation stage is completed, moving objects may be detected accurately in video streams of both low and high bit-rate in a moving object extraction stage discussed hereinafter.

Revisiting FIG. 4, after the structure of the FLD-based RBF network is established, the processing unit 312 may receive a current incoming frame and divides the current incoming frame into a plurality of current incoming blocks (Step S408). In the present embodiment, the current incoming frame may be the next frame received after the aforementioned sequence of incoming frames. The $YC_bC_r$ components of each current incoming pixel $p_t$ are delivered to the input of the FLD-based RBF network. The processing unit 312 may divide the current incoming frame into N×N current incoming blocks, and the similarity of each block is then estimated through a comparison of feature vectors. This may be accomplished by the FLD technique which discerns between the projection of the current incoming blocks and the corresponding lower-dimensional discriminant pattern in order to eliminate unnecessary examination of the background area in video streams of both low and high bit-rates. Thus, at this point, the processing unit 312 may classify each of the current incoming blocks as either a background block or a moving object block according to the discriminant patterns (Step S410, referred to as "a background discriminate procedure").

To be specific, the processing unit 312 may first calculate the projection of each of the current incoming blocks according to the optimal projection vector based on Eq.(10):

$$V_k = W_{opt}^T b_k, \quad \text{Eq.(10)}$$

where $V_k$ is the projection of the $k^{th}$ current incoming block $b_k$; k=1, ... c, c represents the number of all the classes. Note that the block size N herein may also be empirically set to 16.

Next, the processing unit 312 may calculate the similarity level of each of the current incoming blocks by using Euclidean distance between the discriminant pattern and the corresponding projection of each of the current incoming blocks for eliminating unnecessary current incoming blocks which are regarded as belonging to background blocks. When the processing unit 312 determines that the calculated similarity level exceeds a second threshold value $\Delta$, the processing unit 312 may label the block b, as 'class1', which means that the block $b_i$ is classified as a background class and is defined as a background block. When the processing unit 312 determines that the calculated similarity level does not exceed the second threshold value $\Delta$, the processing unit 312 may label the block $b_i$ as 'class2', which means that the block $b_i$ is classified as a moving object class and is defined as a moving object block. Such decision rule my be expressed as Eq.(11):

$$b_i \in \begin{cases} \text{class } 1 & \text{if } \|V_{dpi} - V_i\| > \Delta \\ \text{class } 2 & \text{if } \|V_{dpi} - V_i\| \leq \Delta \end{cases} \quad \text{Eq. (11)}$$

where $V_{dpi}$ represents the discriminant pattern in the $i^{th}$ class; $V_i$ represents the projection in the $i^{th}$ class; $b_i$ represents the current incoming block in the $i^{th}$ class.

Once the unnecessary background blocks have been eliminated via the aforementioned background discriminate procedure, moving objects may be accurately detected within the moving object blocks. The processing unit 312 may now determine whether a current incoming pixel of the moving object blocks is a moving object pixel or a background pixel according to the background model (Step S412, referred to as "an object extraction procedure").

To be specific, each pixel of the current incoming blocks, referred to as the current incoming pixel, is designated as an input vector to the input layer and propagated to the hidden layer neurons. In the following discussion, only one current incoming pixel will be presented for simplicity. The processing unit 312 may use the combination of the basis function and the Euclidean distance to generate the output of each hidden layer neuron, referred to as a hidden layer output, based on Eq.(12):

$$Z_j(p_t) = \phi(\|p_t - C_j\|), \quad \text{Eq.(12)}$$

where j=1, ... M, and M indicates the quantity of the hidden layer neurons; $C_j$ is the $j^{th}$ hidden layer neuron; $p_t$ is the current incoming pixel of the moving object blocks among the current incoming blocks; $\phi(\cdot)$ is the basis function; $\|p_t - C_j\|$ represents the Euclidean distance between $p_t$ and $C_j$. In the present embodiment, the processing unit 312 uses the Gaussian function as the basis function. This representative function may be written as Eq.(12.1):

$$\phi(\|p_t - C_j\|) = \exp\left(-\frac{\|p_t - C_j\|^2}{2\sigma^2}\right), \qquad \text{Eq. (12.1)}$$

where σ is an empirical tolerance with a positive value.

The output of the output neuron (referred to as an output layer output) may be yielded and may be further separated into a binary motion detection mask. That is, the processing unit 312 may obtain the output layer output corresponding to the current incoming pixel according to the hidden layer output and the weights between each of the hidden layer neurons and the output neuron. In the present embodiment, the processing unit 312 may use a weighted linear combination of the hidden and output layers as Eq.(13):

$$F(p_t) = \sum_{j=1}^{M} W_j Z_j(p_t), \qquad \text{Eq. (13)}$$

where $Z_j$ represents the $j^{th}$ hidden layer output, $W_j$ represents the weight between the $j^{th}$ hidden layer neuron and the output layer neuron; $F(p_t)$ represents the output layer output.

After the output layer output is computed, the processing unit 312 may determine if the output layer output is less than a third threshold value δ. If the output layer output is less than the third threshold value δ, the processing unit 312 may determine that the current incoming pixel is the moving object pixel; otherwise, the processing unit 312 may determine that the current incoming pixel is the background pixel. Such decision rule my be expressed as Eq.(14):

$$Y(p_t) = \begin{cases} 1, & \text{if } F(p_t) < \delta \\ 0, & \text{otherwise} \end{cases} \qquad \text{Eq. (14)}$$

where δ is the third threshold value, and $Y(p_t)$ represents a motion pixel when it is labelled as '1'.

Figure 6:
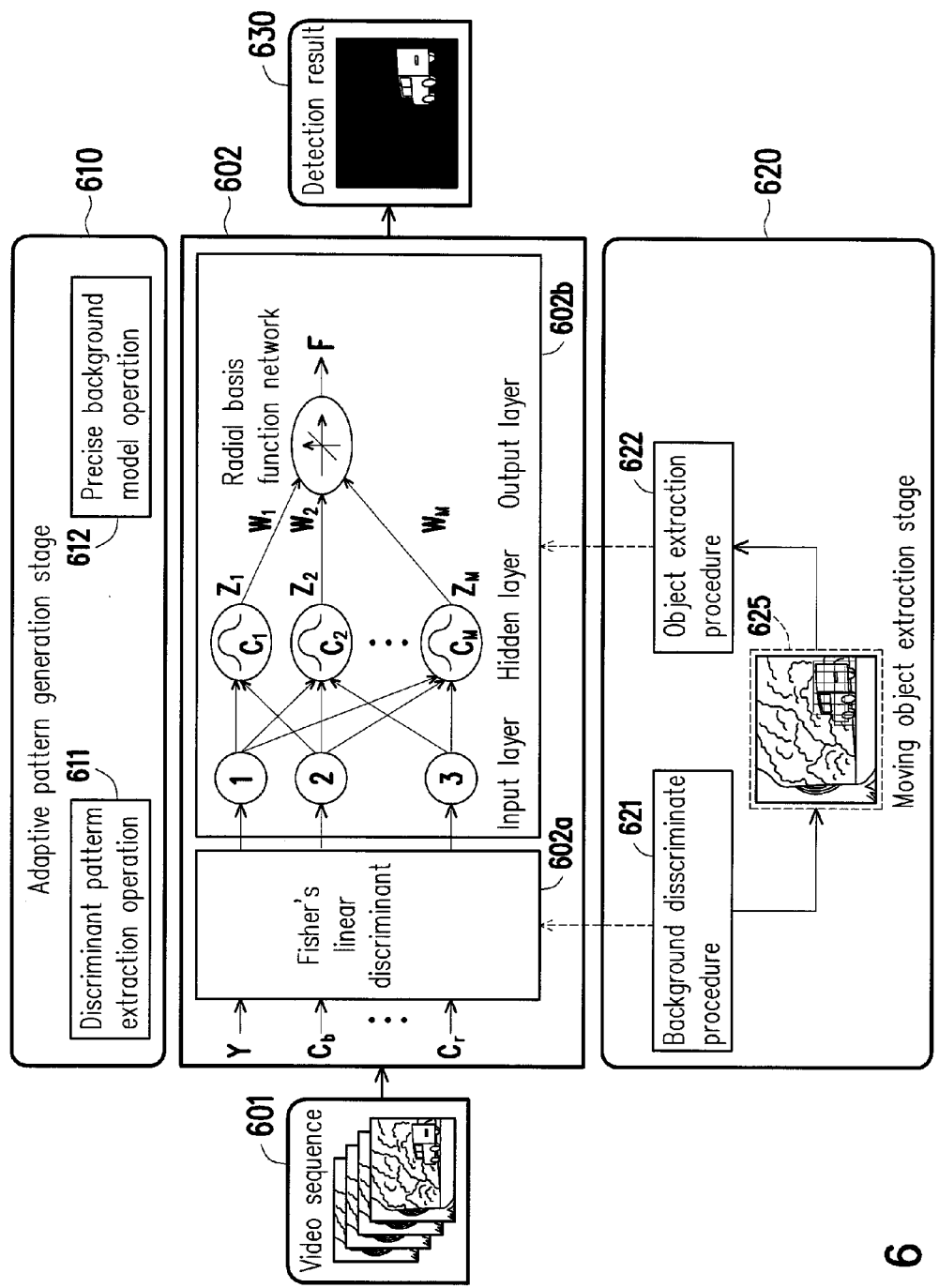
FIG. 6 illustrates a moving object detection method in terms of functional block diagrams in accordance with one of the exemplary embodiments of the present disclosure.

The proposed moving object detection method may be summarized by FIG. 6 in terms of functional block diagrams in accordance with one of the exemplary embodiments of the present disclosure. Referring to FIG. 6, the moving object detection method is arranged in two stages: an adaptive pattern generation stage 610 and a moving object extraction stage 620. The proposed method would take in a video sequence 601. Each incoming frame in the video sequence 601 may be divided into equally-sized blocks for a discriminant pattern extraction operation 611. Lower-dimensional discriminant patterns are then generated from the high-dimensional block image-space through the use of a FLD model 602a to a significantly lower-dimensional feature space to present the variable bit-rate video stream properties. A reliable background model may be established by a precise background model operation 612 by using a RBF network 602b to memorize the variable bit-rate video stream properties.

After the proposed FLD-based RBF network 602 is constructed in the adaptive pattern generation stage 610, moving objects may be detected completely and accurately in video streams of both low and high bit-rate in the moving object extraction stage 620. In order to detect moving objects from within equal-sized blocks of another incoming frame in video streams of variable bit-rate, a background discrimination procedure 621 eliminates the unnecessary blocks which are regarded as belonging to the background class by using the FLD model 602a in a lower-dimensional feature space. Consequently, the moving object detection is only engaged for blocks 625 which are regarded as containing moving objects. This is achieved by using a subsequent objection extraction procedure 622 which is based on the proposed RBF network 602b and is capable of providing a complete and accurate detection result 630 in variable bit-rate video streams.

In view of the aforementioned descriptions, the present disclosure is able to accurately discern a moving object from a background in video streams of variable bit-rates over real-world networks with limited bandwidth which feature realistic situations through a FLD-based RBF network model in an efficient manner.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A moving object detection method based on a Fisher's Linear Discriminant-based Radial Basis Function Network (FLD-based RBF network) comprising:
    receiving a sequence of incoming frames of a fixed location delivered over a network;
    generating a plurality of discriminant patterns from the sequence of incoming frames based on a Fisher's Linear Discriminant (FLD) model having an optimal projection vector, comprising:
        dividing each of the incoming frames into a plurality of training blocks and classifying the training blocks into a plurality of classes;
        calculating a between-class scatter matrix and a within-class scatter matrix according to the training blocks;
        calculating the optimal projection vector by maximizing the ratio of the within-class scatter matrix and the between-class scatter matrix; and
        obtaining each of the discriminant patterns according to the optimal projection vector and the corresponding training block;
    constructing a background model from the sequence of incoming frames based on a Radial Basis Function (RBF) network model, wherein the RBF network model comprises an input layer having a plurality of input layer neurons, a hidden layer having a plurality of hidden layer neurons, and an output layer having an output layer neuron, and wherein there exists a weight between each of the hidden layer neurons and the output layer neuron;

receiving a current incoming frame delivered over the network and dividing the current incoming frame into a plurality of current incoming blocks;

classifying each of the current incoming blocks as either a background block or a moving object block according to the discriminant patterns generated from the sequence of incoming frames based on the FLD model, comprising:
  calculating a projection of each of the current incoming blocks according to the optimal projection vector;
  calculating a similarity level between the discriminant pattern and the projection of each of the current incoming blocks;
  determining if the similarity level exceeds the second threshold value;
  if yes, classifying the current incoming block as the background block; and
  if no, classifying the current incoming block as the moving object block; and determining whether a current incoming pixel of the moving object blocks among the current incoming blocks is a moving object pixel or a background pixel according to the background model.

2. The according to claim 1, wherein the formulas for generating the discriminant patterns from the sequence of incoming frames based on the FLD model comprise Eq.(1)-Eq.(5):

$$S_B = \sum_{i=1}^{c} n_i(u_i - u)(u_i - u)^T, \quad \text{Eq. (1)}$$

$$S_W = \sum_{i=1}^{c} \sum_{x_k \in x_i} (x_k - u_i)(x_k - u_i)^T, \quad \text{Eq. (2)}$$

wherein $S_B$ is the between-class scatter matrix, $S_W$ is the within-class scatter matrix, u and $u_i$ represent a mean training block of all the classes and a mean training block of the $i^{th}$ class respectively, $n_i$ represents the number of the training blocks in the $i^{th}$ class, $x_k$ represents the $k^{th}$ block in the $i^{th}$ class, c represents the number of all the classes, and c is a positive integer, $$W_{opt} = \arg\max_W \frac{|W^T S_B W|}{|W^T S_W W|} = [w_1, w_2, \ldots, w_r] \quad \text{Eq. (3)}$$

wherein $W_{opt}$ is the optimal projection vector, and $[w_1, w_2, \ldots, w_r]$ represents a set of generalized eigenvectors of $S_B$ and $S_W$, $$S_B W_i = \lambda_i S_W W_i, \quad \text{Eq.(4)}$$

wherein $\lambda_i$ represents the $i^{th}$ generalized eigenvalue, $i=1, 2, \ldots r$, r is an empirical lower-dimensional value, r is a positive integer and $r \ll c$, and $$V_{dpk} = W_{opt}^T x_k \quad \text{Eq.(5)}$$

wherein $V_{dpk}$ is the discriminant pattern corresponding to the $k^{th}$ training block $x_k$, and $W_{opt}^T$ is the transposition of $W_{opt}$.

3. The method of claim 1, wherein the step of constructing the background model from the sequence of incoming frames based on the RBF network model comprises:

calculating a difference between an intensity value of each training pixel of the sequence of incoming frames and a background candidate corresponding to each of hidden layer neurons;

determining if the difference exceeds a first threshold value;

if yes, updating the corresponding training pixel as a new background candidate of the corresponding hidden layer neuron;

if no, activating the corresponding hidden layer neuron by a learning rate; and updating the weight between each of the hidden layer neurons and the output layer neuron according to the difference by an empirical learning rate.

4. The method of claim 3, wherein the formulas for constructing the background model from the sequence of incoming frames based on the RBF network model comprise Eq. (6)-Eq.(9):

$$D(p_t(x,y), B(x,y)_j) = \|p_t(x,y) - B(x,y)_j\| \quad \text{Eq.(6)}$$

wherein $j=1, \ldots M$, and M indicates the quantity of the hidden layer neurons and is a positive integer greater than 1, $p_t(x,y)$ is the intensity value of the $i^{th}$ training pixel, $B(x, y)_j$ is the background candidate corresponding to the $j^{th}$ hidden layer neuron, and $D(p_t(x, y), B(x, y)_j)$ denotes as an Euclidean distance between $p_t(x,y)$ and $B(x,y)_j$, $$p_t(x, y) \begin{cases} \notin B(x, y)_j & \text{if } D(p_t(x, y), B(x, y)_j) \geq \varepsilon \\ \in B(x, y)_j & \text{otherwise} \end{cases} \quad \text{Eq. (7)}$$

wherein $\varepsilon$ is the first threshold value, $$B(x,y)'_j = B(x,y)_j + \alpha[p_t(x,y) - B(x,y)_j] \quad \text{Eq.(8)}$$

wherein $\alpha$ is the learning rate with a non-zero value, $B(x,y)_j$ is the original background candidate corresponding to the $j^{th}$ hidden layer neuron, and $B(x,y)'_j$ is the activated hidden layer neuron corresponding to the $j^{th}$ hidden layer neuron, and $$W(x,y)'_j = W(x,y)_j + \beta[F - W(x,y)_j] \cdot D(p_t, B_j) \quad \text{Eq.(9)}$$

wherein $W(x, y)'_j$ is the updated weight between the $j^{th}$ hidden layer neuron and the output neuron, $W(x,y)_j$ is the original weight between the $j^{th}$ hidden layer neuron and the output neuron, $\beta$ is the empirical learning rate with a non-zero value, F is an output value of the output neuron at (x,y).

5. The method of claim 2, wherein the formulas for classifying each of the current incoming blocks as either the background block or the moving object block according to the discriminant patterns comprise Eq.(10)-Eq.(11):

$$V_k = W_{opt}^T b_k, \quad \text{Eq.(10)}$$

wherein $V_k$ is the projection of the $k^{th}$ current incoming block $b_k$, $k=1, \ldots c$, c represents the number of all the classes, $$b_i \in \begin{cases} \text{class 1} & \text{if } \|V_{dpi} - V_i\| > \Delta \\ \text{class 2} & \text{if } \|V_{dpt} - V_i\| \leq \Delta \end{cases} \quad \text{Eq. (11)}$$

wherein $V_{dpi}$, represents the discriminant pattern in the $i^{th}$ class, $V_i$ represents the projection in the $i^{th}$ class, $b_i$, represents the current incoming block in the $i^{th}$ class, class 1 represents a background class, and class 2 represents a moving object class.

6. The method of claim 3, wherein the step of determining whether the current incoming pixel of the moving object blocks among the current incoming blocks is the moving object pixel or the background pixel according to the background model comprises:

designating the current incoming pixel as an input vector to the input layer;

propagating the current incoming pixel to the hidden layer neurons and generating a hidden layer output of each of the hidden layer neurons according to a basis function;

obtaining an output layer output corresponding to the current incoming pixel according to the hidden layer output and the weight between each of the hidden layer neurons and the output layer neuron;

determining if the output layer output is less than a third threshold value;

if yes, determining that the current incoming pixel is the moving object pixel; and if no, determining that the current incoming pixel is the background object pixel.

7. The method of claim 2, wherein the formulas for determining whether the current incoming pixel of the moving object blocks among the current incoming blocks is the moving object pixel or the background pixel according to the background model comprise Eq.(12)-(14):

$$Z_j(p_t) = \phi(\|p_t - C_j\|), \quad \text{Eq.(12)}$$

wherein $j = 1, \ldots M$, and M indicates the quantity of the hidden layer neurons and is a positive integer greater than 1, $C_j$ is the $j^{th}$ hidden layer neuron, $p_t$ is the current incoming pixel of the moving object blocks among the current incoming blocks, $\phi(\cdot)$ is the basis function, and $\|p_t - C_j\|$ represents the Euclidean distance between $p_t$ and $C_j$, $$F(p_t) = \sum_{j=1}^{M} W_j Z_j(p_t), \quad \text{Eq. (13)}$$

wherein $Z_j$ represents the $j^{th}$ hidden layer output, $W_j$ represents the weight between the $j^{th}$ hidden layer neuron and the output layer neuron, and $F(p_t)$ represents the output layer output, $$Y(p_t) = \begin{cases} 1, & \text{if } F(p_t) < \delta \\ 0, & \text{otherwise} \end{cases} \quad \text{Eq. (14)}$$

wherein $\delta$ is the third threshold value, and $Y(p_t)$ represents the moving object pixel when it is labelled as '1'.

8. The method of claim 7, wherein the basis function is a Gaussian function, wherein the Gaussian function is written as Eq.(12.1):

$$\phi(\|p_t - C_j\|) = \exp\left(-\frac{\|p_t - C_j\|^2}{2\sigma^2}\right), \quad \text{Eq. (12.1)}$$

wherein $\sigma$ is an empirical tolerance with a positive value.

9. A moving object detection apparatus, comprising a processor and a memory, wherein the processor is coupled to the memory and is configured for:

receiving a sequence of incoming frames of a fixed location delivered over a network;

generating a plurality of discriminant patterns from the sequence of incoming frames based on a Fisher's Linear Discriminant (FLD) model having an optimal projection vector, comprising:

dividing each of the incoming frames into a plurality of training blocks and classifying the training blocks into a plurality of classes;

calculating a between-class scatter matrix and a within-class scatter matrix according to the training blocks;

calculating the optimal projection vector by maximizing the ratio of the within-class scatter matrix and the between-class scatter matrix; and obtaining each of the discriminant patterns according to the optimal projection vector and the corresponding training block;

constructing a background model from the sequence of incoming frames based on a Radial Basis Function Network (RBF) network model, wherein the RBF network model comprises an input layer having a plurality of input layer neurons, a hidden layer having a plurality of hidden layer neurons, and an output layer having an output layer neuron, and wherein there exists a weight between each of the hidden layer neurons and the output layer neuron;

receiving a current incoming frame delivered over the network and dividing the current incoming frame into a plurality of current incoming blocks;

classifying each of the current incoming blocks as either a background block or a moving object block according to the discriminant patterns generated from the sequence of incoming frames based on the FLD model, comprising:

calculating a projection of each of the current incoming blocks according to the optimal projection vector;

calculating a similarity level between the discriminant pattern and the projection of each of the current incoming blocks;

determining if the similarity level exceeds the second threshold value;

if yes, classifying the current incoming block as the background block; and if no, classifying the current incoming block as the moving object block; and determining whether a current incoming pixel of the moving object blocks among the current incoming blocks is a moving object pixel or a background pixel according to the background model.

10. The apparatus of claim 9, wherein the processor is configured for generating the discriminant patterns from the sequence of incoming frames based on the FLD model according to Eq.(1)-Eq.(5):

$$S_B = \sum_{i=1}^{c} n_i (u_i - u)(u_i - u)^T, \quad \text{Eq. (1)}$$

$$S_W = \sum_{i=1}^{c} \sum_{x_k \in x_i} (x_k - u_i)(x_k - u_i)^T, \quad \text{Eq. (2)}$$

wherein $S_B$ is the between-class scatter matrix, $S_W$ is the within-class scatter matrix, u and $u_i$ represent a mean training block of all the classes and a mean training block of the $i^{th}$ class respectively, $n_i$ represents the number of the training blocks in the $i^{th}$ class, $x_k$ represents the $k^{th}$ block in the $i^{th}$ class, c represents the number of all the classes, and c is a positive integer, $$W_{opt} = \arg\max_{W} \frac{|W^T S_B W|}{|W^T S_W W|} = [w_1, w_2, \ldots, w_r] \quad \text{Eq. (3)}$$

wherein $W_{opt}$ is the optimal projection vector, and $[w_1, w_2, \ldots, w_r]$ represents a set of generalized eigenvectors of $S_B$ and $S_W$, $$S_B W_i = \lambda_i S_w W_i, \quad \text{Eq.(4)}$$

wherein $\lambda_i$ represents the $i^{th}$ generalized eigenvalue, $i=1, 2, \ldots r$, r is an empirical lower-dimensional value, and r is a positive integer and r<c, and $$V_{dpk} = W_{opt}^T x_k \quad \text{Eq.(5)}$$

wherein $V_{dpk}$ is the discriminant pattern corresponding to the $k^{th}$ training block $x_k$, and $W_{opt}^T$ is the transposition of $W_{opt}$.

11. The apparatus of claim 9, wherein the processor is configured for constructing the background model from the sequence of incoming frames based on the RBF network model comprising:

calculating a difference between an intensity value of each training pixel of the sequence of incoming frames and a background candidate corresponding to each of hidden layer neurons;

determining if the difference exceeds a first threshold value;

if yes, updating the corresponding training pixel as a new background candidate of the corresponding hidden layer neuron;

if no, activating the corresponding hidden layer neuron by a learning rate; and updating the weight between each of the hidden layer neurons and the output layer neuron according to the difference by an empirical learning rate.

12. The apparatus of claim 11, wherein the processor is configured for constructing the background model from the sequence of incoming frames based on the RBF network model according to Eq.(6)-Eq.(9):

$$D(p_t(x,y), B(x,y)_j) = \|p_t(x,y) - B(x,y)_j\| \quad \text{Eq.(6)}$$

wherein $j=1, \ldots M$, and M indicates the quantity of the hidden layer neurons and is a positive integer greater than 1, $p_t(x,y)$ is the intensity value of the $i^{th}$ training pixel, $B(x,y)_j$ is the background candidate corresponding to the $j^{th}$ hidden layer neuron, and $D(p_t(x,y), B(x,y)_j)$ denotes as an Euclidean distance between $p_t(x,y)$ and $B(x,y)_j$, $$p_t(x,y) \begin{cases} \notin B(x,y)_j & \text{if } D(p_t(x,y), B(x,y)_j) \geq \varepsilon \\ \in B(x,y)_j & \text{otherwise} \end{cases} \quad \text{Eq. (7)}$$

wherein $\varepsilon$ is the first threshold value, $$B(x,y)'_j = B(x,y)_j + \alpha[p_t(x,y) - B(x,y)_j] \quad \text{Eq.(8)}$$

wherein $\alpha$ is the learning rate with a non-zero value, $B(x,y)_j$ is the original background candidate corresponding to the $j^{th}$ hidden layer neuron, and $B(x,y)'_j$ is the activated hidden layer neuron corresponding to the $j^{th}$ hidden layer neuron, and $$W(x,y)'_j = W(x,y)_j + \beta[F - W(x,y)_j] \cdot D(p_t, B_j) \quad \text{Eq.(9)}$$

wherein $W(x,y)'_j$ is the updated weight between the $j^{th}$ hidden layer neuron and the output neuron, $W(x,y)_j$ is the original weight between the $j^{th}$ hidden layer neuron and the output neuron, $\beta$ is the empirical learning rate with a non-zero value, F is an output value of the output neuron at $(x,y)$.

13. The apparatus of claim 10, wherein the processor is configured for classifying each of the current incoming blocks as either the background block or the moving object block according to the discriminant patterns according to Eq.(10) and Eq.(11):

$$V_k = W_{opt}^T b_k, \quad \text{Eq.(10)}$$

wherein $V_k$ is the projection of the $k^{th}$ current incoming block $b_k$, $k=1, \ldots c$, c represents the number of all the classes, $$b_i \in \begin{cases} \text{class 1} & \text{if } \|V_{dpi} - V_i\| > \Delta \\ \text{class 2} & \text{if } \|V_{dpi} - V_i\| \leq \Delta \end{cases} \quad \text{Eq. (11)}$$

wherein $V_{dpi}$ represents the discriminant pattern in the $i^{th}$ class, $V_i$ represents the projection in the $i^{th}$ class, $b_i$ represents the current incoming block in the $i^{th}$ class, class 1 represents a background class, and class 2 represents a moving object class.

14. The apparatus of claim 11, wherein the processor is configured for determining whether the pixel of the moving object blocks is the moving object pixel or the background pixel according to the background model comprising:

designating the current incoming pixel as an input vector to the input layer;

propagating the current incoming pixel to the hidden layer neurons and generating a hidden layer output of each of the hidden layer neurons according to a basis function;

obtaining an output layer output corresponding to the current incoming pixel according to the hidden layer output and the weight between each of the hidden layer neurons and the output layer;

determining if the output layer output is less than a third threshold value;

if yes, determining that the current incoming pixel is the moving object pixel; and if no, determining that the current incoming pixel is the background object pixel.

15. The apparatus of claim 10, wherein the processor is configured for determining whether the pixel of the moving object blocks is the moving object pixel or the background pixel according to the background model according to Eq. (12)-(14):

$$Z_j(p_t) = \phi(\|p_t - C_j\|), \quad \text{Eq.(12)}$$

wherein $j=1, \ldots M$, and M indicates the quantity of the hidden layer neurons and is a positive integer greater than 1, $C_j$ is the $j^{th}$ hidden layer neuron, $p_t$ is the current incoming pixel of the moving object blocks among the current incoming blocks, $\phi(\cdot)$ is the basis function, and $\|p_t - C_j\|$ represents the Euclidean distance between $p_t$ and $C_j$, $$F(p_t) = \sum_{j=1}^{M} W_j Z_j(p_t), \quad \text{Eq. (13)}$$

wherein $Z_j$ represents the $j^{th}$ hidden layer output, $W_j$ represents the weight between the $j^{th}$ hidden layer neuron and the output layer neuron, and $F(p_t)$ represents the output layer output, $$Y(p_t) = \begin{cases} 1, & \text{if } F(p_t) < \delta \\ 0, & \text{otherwise} \end{cases} \quad \text{Eq. (14)}$$

wherein $\delta$ is the third threshold value, and $Y(p_t)$ represents the moving object pixel when it is labelled as '1'.

16. The apparatus of claim 15, wherein the basis function is a Gaussian function, wherein the Gaussian function is written as Eq.(12.1):

$$\phi(\|p_t - C_j\|) = \exp\left(-\frac{\|p_t - C_j\|^2}{2\sigma^2}\right), \quad \text{Eq. (12.1)}$$

wherein $\sigma$ is an empirical tolerance with a positive value.

\* \* \* \* \*